United States Patent [19]
Takeda et al.

[11] Patent Number: 5,928,704
[45] Date of Patent: *Jul. 27, 1999

[54] PROCESS FOR PREPARING A FAT FOR PREVENTING FAT BLOOMING OF CHOCOLATE

[75] Inventors: Naosuke Takeda, Sakai; Miho Hayashi, Osaka; Shuichi Yamaguchi, Sakai; Tsugio Nishimoto, Naga-gun, all of Japan

[73] Assignee: Fuji Oil Company, Limited, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/728,072

[22] Filed: Oct. 9, 1996

[30] Foreign Application Priority Data

Oct. 12, 1995 [JP] Japan ................................ 7-263890

[51] Int. Cl.$^6$ ...................................... A23D 9/06
[52] U.S. Cl. .......................... 426/610; 426/606; 426/607
[58] Field of Search ................................... 426/606, 607, 426/610

[56] References Cited

U.S. PATENT DOCUMENTS

| | | | |
|---|---|---|---|
| 3,492,130 | 1/1970 | Harwood . | |
| 4,447,462 | 5/1984 | Tafuri | 426/601 |
| 4,726,959 | 2/1988 | Momura | 426/607 |
| 4,877,636 | 10/1989 | Koyano | 426/607 |
| 5,066,510 | 11/1991 | Ehrman | 426/607 |
| 5,508,048 | 4/1996 | Padley | 426/607 |
| 5,529,803 | 6/1996 | Yamada | 426/606 |

FOREIGN PATENT DOCUMENTS

| | | |
|---|---|---|
| 0 196 780 | 10/1986 | European Pat. Off. . |
| 0 227 364 | 7/1987 | European Pat. Off. . |
| 0 276 548 | 8/1988 | European Pat. Off. . |
| 0 321 227 | 6/1989 | European Pat. Off. . |
| 0 674 837 | 10/1995 | European Pat. Off. . |
| 3-172151 | 7/1991 | Japan . |
| 1205729 | 9/1970 | United Kingdom . |

OTHER PUBLICATIONS

Minifie 1980 Chocolate, Cocoa and Confectionery AVI Publishing Company Inc. Westport CT pp. 494–507.
I. Hachiya et al., *JAOCS*, 66(12), 1763–1770 (Dec. 1989).

*Primary Examiner*—Carolyn Paden
*Attorney, Agent, or Firm*—Wenderoth, Lind & Ponack, L.L.P.

[57] ABSTRACT

There is disclosed shortening for chocolate which contains SUS type triglycerides whose constituent fatty acids contain SUS saturated fatty acids having 20 to 24 carbon atoms and SSU type and/or type triglycerides whose constituent fatty acids do not contain saturated fatty acids having 20 or more carbon atoms, both triglycerides being present in an eutectic crystal state, and a crystal form of said former SUS type triglycerides being in a stable crystal form. A process for producing the shortening, chocolate comprising the shortening and a process for producing the chocolate are also disclosed.

5 Claims, No Drawings

PROCESS FOR PREPARING A FAT FOR PREVENTING FAT BLOOMING OF CHOCOLATE

FIELD OF THE INVENTION

The present invention relates to shortening and its use. More specifically, it relates to shortening which functions as a material for simplifying a tempering operation in chocolate production and as a material for preventing fat blooming caused by allowing chocolate to stand at a temperature at which almost all chocolate products are melted, for example, at a temperature of about the body heat, for a certain period of time. It also relates to utilization of the shortening in chocolate.

BACKGROUNDS OF THE INVENTION

In general, chocolate has such a problem that it causes blooming phenomenon during storage to deteriorate its commercial value. This blooming phenomenon is divided into "fat blooming" due to unstable crystals of fats and oils and "sugar blooming" due to recrystallization of sugar. In particular, fat blooming is dominant.

In order to prevent fat blooming, a tempering process is employed from the viewpoint that a fat-and-oil ingredient of chocolate is transferred to a stable crystal form as much as possible and this is considered to be an important step in chocolate production. However, fat blooming is still caused because of, for example, insufficient tempering, temperature changes during marketing and storage stages of chocolate products. In particular, when chocolate products are exposed to a high temperature such as about the body heat for a certain period of time, it is very difficult to prevent fat blooming, even if the products are subjected to an excellent tempering process.

As a method for preventing fat blooming in a case that chocolate products are exposed to a high temperature such as about the body heat, JP-A 63-240745 has proposed a method using a chocolate additive in the form of powdery particles. However, there is a problem that a relatively time-consuming treatment is required to obtain a stable crystal form. In addition, since the apparent specific gravity of the particles is light, certain improvement of their dispersion in a mixture of chocolate ingredients is required.

Further, although, as described above, a tempering process is an important step in chocolate production, normally, such process includes cooling and re-warming (re-heating) steps, respectively, at least once [Seika-Jiten (Confectionery Dictionary), page 459, October, 1981, published by Asakura Shoten]. Then, since cooling and heating are involved, great energy loss is caused. In view of this, there is a tendency to omit a tempering process, if possible.

For solving this problem, JP-A 2-406 has proposed a method using shortening for chocolate. This shortening is easily handled and is utilized as useful shortening for omitting or simplifying a tempering operation.

However, in a case of shortening for chocolate comprising as a main ingredient triglycerides whose total carbon atoms are 50 or more, in particular, up to 56, their crystallographic behavior is similar to cacao butter which is one of chocolate ingredients and therefore, when chocolate is exposed to a high temperature at which almost all chocolate products are melted, its function as a material for preventing fat blooming is scarcely expected.

Furthermore, since this shortening contains a considerable amount of fats and oils which are rich in low melting point components, it greatly influences on properties of chocolate. In particular, when a liquid fat is used as a low melting point component, such problem as lowering of heat resistance of chocolate is also caused. Moreover, when such chocolate is coated on a snack such as baked confectionery, the liquid fat migrates to the baked confectionery portion. This migration causes a problem of blooming of complex confectionery such as snack coated with chocolate.

OBJECTS OF THE INVENTION

The main object of the present invention is to provide shortening, which functions as a material for simplifying a tempering operation of chocolate and as a material for preventing blooming even when chocolate is exposed to a high temperature such as about the body heat for a certain period of time (self restoring function) and which can be easily handled, so as to utilize the shortening for prevention of blooming of chocolate.

This object as well as other objects and advantages of the present invention will become apparent to those skilled in the art from the following description.

SUMMARY OF THE INVENTION

According to the present invention, there is provided shortening which comprises as a main component SUS type triglycerides whose constituent fatty acids contain saturated fatty acids having 20 to 24 carbon atoms and SSU type and/or SUS type triglycerides whose constituent fatty acids do not contain saturated fatty acids having 20 or more carbon atoms, a main crystal form of said former SUS type triglycerides being in a stable crystal form.

The present invention also provides a process for producing the shortening, chocolate comprising the shortening and a process for producing the chocolate.

The shortening of the present invention has self restoring function, that is, it functions as a material for preventing blooming even when chocolate using it is exposed to a high temperature such as about the body heat for a certain period of time. In addition, it is possible to provide good blooming resistance over a broad temperature range, when the shortening is used together with another fat-and-oil ingredient which functions as a material for preventing fat blooming at a temperature lower than the temperature at which the shortening exhibits its self restoring function.

DETAILED DESCRIPTION OF THE INVENTION

Composition of Shortening

In the present invention, SUS type triglycerides represent 2-unsaturated-1,3-disaturated triglycerides, wherein S is a saturated fatty acid residue and U is an unsaturated fatty acid residue, in most cases, oleic acid residue. Likewise, SSU triglycerides represent 3-unsaturated-1,2-disaturated (or 1-unsaturated-2,3-disaturated) triglycerides.

Then, examples of the SUS type triglycerides whose constituent fatty acids contain saturated fatty acids having 20 to 24 carbon atoms (hereinafter sometimes referred to as "seed glycerides") include BOB (2-oleoyl-1,3-dibehenyl glycerin), BOSt (1-behenyl-2-oleoyl-3-stearoyl glycerin) and the like. The SUS type triglycerides, wherein both S's are saturated fatty acid residues having 20 to 24 carbon atoms, such as BOB are preferred.

Such seed glycerides can be prepared by an interesterification method using an enzyme having 1,3-specificity as described in, for example, JP-A 63-240745. That is, fatty acids predominantly containing saturated fatty acids having 20 to 24 car on atoms can be obtained by hydrogenating, decomposing and fractionating, for example, rapeseed oil, Raphanus sativus oil, Lunaria annua oil, fish oil or whale oil or the like, interestrifying the resultant fatty acid residues or their esters with a fat or oil having unsaturated fatty acid residues (mainly oleic acid residue) at 2-position, for example, high oleic sunflower oil to attach the saturated fatty acids to the triglycerides of the fat or oil at 1,3-positions selectively.

Examples of the SSU type and/or SUS type triglycerides whose constituent fatty acids do not contain saturated fatty acids having 20 or more carbon atoms (hereinafter sometimes referred to as "hard butter type glycerides") include POSt (2-oleoyl-1,3-palmitostearoyl glycerin), POP (1,3-dipalmitoyl-2-oleoyl glycerin), StStO (1,2-distearoyl-3-oleoyl glycerin) and the like. Examples of fats and oils containing these triglycerides include cacao butter, shea butter, sal fat, illipe butter, palm oil and the like. Processed products of these fats and oils such as fractionated, hydrogenated, randomly interesterified products thereof as well as already prepared hard butter can also be used.

The composition of the hard butter type glycerides can be determined according to the desired quality of chocolate to which the shortening is added. For example, when the shortening of the present invention is added to chocolate, there is a tendency that a fat-and-oil ingredient of chocolate is apt to cause melting point depression due to addition of the long chain triglycerides, seed glycerides, which results in softening of chocolate. In order to prevent this, a high melting point component such as StOSt can be used in a larger amount. Alternatively, it is possible to provide anti-blooming effect to chocolate over a broader temperature range by using a component which shows anti-blooming effect at a lower temperature range (normally, 30 to 34° C.) than a melting temperature of chocolate, for example, StStO in an amount of more than about 10% in the hard butter type glycerides.

In the shortening of the present invention, the predominant part of crystals of seed glycerides should be in a stable crystal form. The stable crystal form used herein means a crystal form showing 4 or more peaks of short (side) spacing in its X-ray diffraction spectrum and, preferably, V form or more stable form according to the method used for defining crystal forms of cacao butter by R. L. Wille and E. S. Luiton [J.A.O.C.S., 43, 491–496 (1966)]. However, when a large amount of amorphous fats and oils are present or a plurality of crystal forms are present, weak peaks of short spacing in a X-ray diffraction spectrum are not always clear. Then, the stable crystal form can be judged by comparing predominant peaks of short spacing with those of a known stable crystal form to determine whether or not they agree with each other. For example, a peak of the most stable crystal form of a triglyceride whose total carbon atom number of its fatty acid residues is about 54 is located at around 4.6 Å and, when a predominant peak of a shortening containing such triglyceride is observed at around 4.6 Å, it can be said that its predominant crystal form is in a stable crystal form.

If the seed glycerides are not in a stable crystal form, it is difficult to obtain tempering-promoting effect and anti-blooming effect at a temperature at which almost all chocolate products are melted, i.e., self restoring function.

The shortening of the present invention must be contain both above seed glycerides and hard butter type glycerides. The weight ratio of the seed glycerides to the hard butter type glycerides is 0.1 to 0.9, preferably 0.3 to 0.7. If the ratio is less than 0.1, an amount to be added as shortening becomes too much. On the other hand, the ratio is more than 0.9, the above effect becomes insufficient.

In addition, it is necessary that both seed glycerides and hard butter type glycerides are present in an eutectic crystal state, that is, respective crystals are present crystallographically independently. For this purpose, the weight ratio of the seed glycerides to the hard butter type glycerides is also preferably 0.1 or more. When the ratio is less than 0.1, the crystalline state produced by melting and cooling during the production of shortening as described hereinafter is apt to become so-called mixed crystals wherein both crystals are fused to each other. In case of mixed crystals, a melting point of crystals is depressed and self restoring function is scarcely expected.

In addition to these components, the shortening of the present invention can contain other fat-and-oil components, various known additives for shortening such as an emulsifier (e.g., glycerin fatty acid esters, lecithin, etc.) and an antioxidant (e.g., ascorbic acid, tocopherol, citric acid, etc.), and the like, though they are not essential as in conventional shortening. Furthermore, the shortening can contain known chocolate ingredients such as sugar, milk powder, cacao mass, an emulsifier and the like.

Production of Shortening

The shortening can be produced by mixing and melting the seed glycerides and the hard butter type glycerides and cooling the resultant mixture with kneading. This cooling and kneading can be carried out with a known cooling and kneading device which is commonly used in conventional shortening production such as Combinator, or the like under conventional conditions. And, there is no particular need to increase cooling capacity. Gas such as air, nitrogen gas or the like can be blown through the shortening during kneading.

According to this process, crystalline particle size of seed glycerides can be very easily reduced to less than $100\mu$, preferably, less than $40\mu$, which results in excellent dispersibility into chocolate and the amount of the shortening to be used becomes smaller to obtain the desired function. Furthermore, since fine crystalline particles can be obtained, time required for stabilization of crystals of seed glycerides can be shorten. In comparison with other processes such as spraying from a spray dryer or pulverization of solid fats in the form of masses or crude particles as such or with a suitable dispersing medium, this process is generally cheaper.

Then, crystals of seed glycerides are stabilized by melt-mediated phase transition of the shortening. Although stabilization can be carried out without this tempering step, in such a case, it takes about up to 1 month at ordinary temperature and it is impractical. The stabilization can be carried out at a temperature of, at lowest, a melting temperature of instable crystals of the hard butter type glycerides but lower than a temperature at which the entire shortening is completely melted. Preferably, the stabilization is carried out by elevating a temperature stepwise within the above temperature range according to transition of crystal forms due to the tempering. An embodiment of the stepwise elevation of temperature is to always store the shortening at a stabilization temperature lower than melting point of crystals by 2 to 3° C. Since it is troublesome to change the stabilization temperature, continuously, in practice, the stabilization temperature is changed day by day, for example, as follows.

In case that the weight ratio of seed glycerides/hard butter type glycerides is 1/1, a first step stabilization temperature of 30° C., a second step stabilization temperature of 35° C. and a third step stabilization temperature of 40° C. can be employed and the shortening is stabilized at each temperature for 1 day, respectively. When this stabilization is carried out, the hard butter type glycerides becomes a melt state and accelerates transition (stabilization) of the crystal form of seed glycerides (melt-mediated phase transition).

By adding the shortening thus obtained to chocolate, the shortening functions as a material for omitting or simplifying a temperature process in chocolate production and, after production of chocolate, the shortening can prevent fat blooming upon exposure of chocolate to a high temperature such as about the body heat by self restoring function of the seed glycerides.

Furthermore, by selecting the hard butter type glycerides according to the desired quality of chocolate, such advantages as improvement of heat resistance, prevention of fats and oils migration, prevention of fat blooming over a broad temperature range and the like can be obtained. For example, heat resistance can be improved by using a commercially available Melano SS-400 (manufactured by Fuji Oil Co., Ltd., Japan) as the hard butter type glycerides. For preventing fat blooming over a broad temperature range, Melano EE-NF100F (manufactured by Fuji Oil Co. Ltd., Japan) can be used as the hard butter type glycerides.

Chocolate and its Production

The present invention further includes chocolate containing the shortening of the present invention in such a state that the stable crystal form of the seed glycerides is substantially maintained, and a process for producing the chocolate.

The chocolate of the present invention suitably contains the above-described shortening of the present invention in an amount of, normally, 1.0 to 10% by weight as the amount (weight basis) of the stabilized crystals of the seed glycerides. The other ingredients are not specifically limited and powdered sugar, emulsifiers, flavors, coloring agents and the like can be appropriately added. In addition, hard nut ingredients such as almond powder and the like, peanut butter, powdered cheese and the like instead of cacao ingredients can be used for providing flavor different from chocolate. Or, various chocolate products such as colored chocolate wherein a white chocolate base is colored can be produced.

Chocolate to which the shortening of the present invention is added is preferably that already subjected conching process and melted because, when the shortening is added to chocolate prior to conching process, the stabilized crystals of seed glycerides are apt to be melted at a temperature of conching process. The shortening is preferably added during cooling and solidification steps of chocolate. Therefore, the shortening is desirably added at a temperature at which a mixture of chocolate ingredients are completely melted, or lower, preferably, at 32 to 36° C.

Although, normally, the shortening of the present invention does not have fluidity at ordinary temperature, as occasion demands, it can be readily plasticized or fluidized by heating. However, when the heating is carried out at a temperature of higher than 40° C. for a long period of time, the stable crystals of the seed glycerides are apt to be melted and therefore this needs care. When the shortening is added in a plasticized or fluidized state, in comparison with a powdery state, mixing with chocolate ingredients can be readily done and, since the stabilized crystals are sufficiently comminuted, they can be dispersed very well.

By addition of the shortening, a re-heat step which is normally employed in a tempering process can be omitted. Thereby, it is possible to subject the chocolate to casting or enrobing immediately after addition and dispersion of the shortening and, in practical, a tempering step is scarcely required.

In addition, after production of the chocolate, self restoring function can prevent fat blooming even when chocolate exposed to a high temperature at which almost all chocolate products are melted, for example, at about the body heat for a certain period of time.

The following examples and comparative examples further illustrate the present invention in detail but are not to be construed to limit the scope thereof. In the following examples and comparative examples, all the "parts" and "percents" are by weight.

EXAMPLE 1

Preparation of Seed Glycerides

Fully hydrogenated high erucic rapeseed oil containing 45% of an unsaturated fatty acid having 22 carbon atoms was hydrolyzed and esterified to obtain fatty acid ethyl esters. The fatty acid ethyl esters were fractionated to obtain a fraction containing 97.6% of esters of saturated fatty acids having 20 to 24 carbon atoms. Seventy parts of these fatty acid esters were mixed with 30 parts of high oleic sunflower oil and interesterification with an enzyme having 1,3-specificity was carried out to obtain a reaction oil having an iodine value (IV) of 45. The oil was further fractionated with a solvent to obtain a high melting point fraction (yield 57.6%). This oil contained 83% of SUS-type triglycerides whose constituent fatty acids at both 1,3-positions are saturated fatty acids having 20 to 24 carbon atoms.

Production of Shortening

Thirty three parts of the above-obtained high melting point fraction was mixed with 67 parts of hard butter (StOSt content: 66%, the ratio of St content to P content: 13) and the mixture was melted with heating at 50° C. or higher. The melted mixture was quickly cooled and kneaded with a Combinator to obtain shortening.

Stabilization of Crystals

The resultant shortening was subjected to stepwise temperature elevation by standing for one day each at 30° C., 35° C. and then 40° C., respectively. Then, its crystal form was analyzed by X-ray diffraction and it was confirmed that a predominant peak of short spacing was observed at 4.6 Å and predominant peaks of long spacing were observed at 36 to 37 Å. Thus, BOB crystals were stabilized.

Chocolate Production

Chocolate ingredients composed of 40 parts of cacao mass, 50 parts of powdered sugar, 10 parts of cacao butter and lecithin in an amount of 0.4% based on the total weight of these ingredients were completely melted. When a temperature of the chocolate ingredient mixture became 35° C., the above shortening which had been fluidized by heating at a product temperature of 40° C. was added thereto in an amount of 5% based on the total weight of the chocolate ingredient mixture and the resultant mixture was stirred for 15 minutes. Then, the mixture was cast into a mold and release from the mold was evaluated after standing at ambient temperature of about 5° C. for 30 minutes. As a result, release from the mold was good and chocolate having good gloss was obtained.

COMPARATIVE EXAMPLE 1

Sixty seven parts of the high melting point fraction obtained in Example 1 was mixed with 33 parts of hydrogenated rapeseed oil and the mixture was melted by heating at 50° C. or higher. Then, according to the same manner as in Example 1, the mixture was quickly cooled and kneaded to obtain shortening. The shortening was allowed to stand at 43° C. for 3 days. Then, its crystal form was analyzed by X-ray diffraction. As a result, it was confirmed that a predominant peak of short spacing was observed at 4.6 Å and thus the crystals of the shortening were stabilized.

Chocolate ingredients composed of 40 parts of cacao mass, 50 parts of powdered sugar, 10 parts of cacao butter and lecithin in an amount of 0.4% based on the total weight of these ingredients were completely melted. When a temperature of the chocolate ingredient mixture became 35° C., the above shortening at a product temperature of 46° C. was added thereto in an amount of 2% based on the total weight of the chocolate ingredient mixture and the resultant mixture was stirred for 15 minutes. Then, the mixture was cast into a mold and release from the mold was evaluated after standing at ambient temperature of about 5° C. for 30 minutes. As a result, release from the mold was good and chocolate having good gloss was obtained.

COMPARATIVE EXAMPLE 2

Chocolate was produced by using the chocolate ingredient mixture used in Example 1 without addition of the shortening and subjecting a conventional tempering treatment.

COMPARATIVE EXAMPLE 3

Chocolate was produced by using the powdery chocolate additive particles disclosed in JP-A 63-240745 (powdery BOB seeds) instead of the shortening of Example 1. Namely, the chocolate ingredient mixture was tempered at 34±2° C. Then, powdery seeds were added to the chocolate ingredient mixture in an amount of 3% based on the weight of the chocolate. After stirring for 15 minutes, the chocolate was cast in a mold and release from the mold was evaluated after standing at ambient temperature of 5° C. for 30 minutes. As a result, release from the mold is good and chocolate having good gloss was obtained.

Blooming Test (High Temperature Range)

The chocolate products obtained in Example 1 and Comparative Examples 1 and 2 were subjected to a cycle test wherein a cycle of standing at 17° C. for 12 hours and then at 37° C. for 12 hours was repeated. No blooming was observed with respect to the chocolate products of Example 1 and Comparative Example 1 even after repetition of 20 cycles, while blooming was observed with respect to the chocolate product of Comparative Example 2 after just one cycle.

Heat Resistance Test

As an indication of heat resistance, hardness of the chocolate products obtained in Example 1 and Comparative Examples 1, 2 and 3 were determined at respective temperatures as shown in Table 1 with Rheometer (manufactured by Fudo Kogyo, Japan). The values in Table 1 represent values of peak stress (g) of a plunger of 3 mm diameter upon penetrating into the chocolate product at a rate of 5 cm/minute.

TABLE 1

| Chocolate products | 29° C. | 30° C. | 40° C. |
|---|---|---|---|
| Example 1 | 1040 | 540 | 190 |
| Comparative Example 1 | 650 | 280 | 50 |
| Comparative Example 2 (conventional tempering) | 1125 | 530 | 180 |
| Comparative Example 3 (powdery seeds) | 750 | 300 | 80 |

As seen from Table 1, in the chocolate product of Example 1, the shortening of the present invention exhibits its excellent function and the chocolate product of Example 1 shows similar excellent heat resistance as that of normal chocolate using only cacao butter. On the other hand, in the chocolate product of Comparative Example 2, the product is soften due to influence of the liquid oil ingredient and, in the chocolate product of Comparative Example 3, heat resistance is deteriorated because of melting point depression of the fat-and-oil ingredient of the product.

EXAMPLE 2

According to the same manner as in Example 1, shortening was prepared except that Melano EE-NF100F (manufactured by Fuji Oil Co., Ltd., Japan) which contained 30% of StStO was used as the hard butter type glycerides. Stabilization of crystals of the shortening was carried out under the same tempering conditions (a predominant peak of short spacing was observed at 4.6 Å).

Chocolate ingredients composed of 35 parts of cacao mass, 50 parts of powdered sugar, 5 parts of cacao butter and lecithin in an amount of 0.4% based on the total weight of these ingredients were completely melted. When a temperature of the chocolate ingredient mixture became 35° C., the above shortening which was fluidized by heating at a product temperature of 40° C. was added thereto in an amount of 15 parts per 90 parts of the chocolate ingredient mixture and the resultant mixture was stirred for 15 minutes. Then, the mixture was cast into a mold and release from the mold was evaluated after standing at ambient temperature of about 5° C. for 30 minutes. As a result, release from the mold was good and chocolate having good gloss was obtained.

COMPARATIVE EXAMPLE 4

Chocolate was produced by adding 10 parts of cacao butter to the chocolate ingredient mixture of Example 2 and the powdery seeds in an amount of 5% based on the total weight of the chocolate product. Conditions such as stirring and product temperatures were the same as those in Comparative Example 3.

COMPARATIVE EXAMPLE 5

According to the same manner as in Comparative Example 3, chocolate was produced except that the powdery seeds were not added and a conventional tempering treatment was carried out.

Blooming Test

The chocolate products obtained in Example 2 and Comparative Examples 4 and 5 were subjected to a cycle test wherein a cycle of standing at 17° C. for 12 hours and then at 37° C. for 12 hours was repeated. No blooming was observed with respect to the chocolate product of Example 2 even after repetition of 20 cycles, while blooming was observed with respect to the chocolate products of Comparative Examples 4 and 5 after one or two cycles.

EFFECT OF THE INVENTION

As described hereinabove, the shortening of the present invention has self restoring function, that is, it functions as a material for preventing blooming even when chocolate using it is exposed to a high temperature such as almost all chocolate products are melted, such as about the body heat for a certain period of time. In addition, it is possible to provide good blooming resistance over a broad temperature range, when the shortening is used together with another fat-and-oil ingredient which functions as a material for preventing fat blooming at a temperature lower than the temperature at which the shortening exhibits its self restoring function.

What is claimed is:

1. A process for producing a material for preventing fat blooming of chocolate which comprises melting SUS type triglycerides whose constituent fatty acids contain saturated fatty acids having 20 to 24 carbon atoms and SSU type and/or SUS type triglycerides whose constituent fatty acids do not contain saturated fatty acids having 20 or more carbon atoms, the weight ratio of the SUS type triglycerides to the SSU type and/or SUS type triglycerides being 0.1 to 0.9, cooling them with kneading and stabilizing unstable crystals of the SUS type triglycerides in the presence of a melt of the SSU type and/or SUS type triglycerides to obtain the material in a solid form at ordinary temperature.

2. A process for producing the material for preventing fat blooming of chocolate according to claim 1, wherein stabilization of unstable crystals of the SUS type triglycerides is carried out at a temperature not lower than that at which the least unstable crystals of the SSU type and/or SUS type triglycerides are melting but lower than that at which the entire shortening material is completely melted.

3. A process for producing the material for preventing fat blooming of chocolate according to claim 2, wherein stabilization is carried out by stepwise elevation of temperature.

4. A method for providing anti-fat blooming effect to chocolate comprising adding the material obtained by the process according to claim 1 to chocolate.

5. A method for omitting a tempering step in the production of chocolate which comprises adjusting a chocolate ingredient mixture at a temperature of 32 to 36° C. and adding thereto the material obtained by the process according to claim 1 which has been plasticized or fluidized by heating to a temperature not higher than 40° C.

* * * * *